United States Patent [19]

Ashley

[11] 4,015,908
[45] Apr. 5, 1977

[54] MULTIPLE-PIECE CRANKSHAFT
[75] Inventor: Allan J. Ashley, North Aurora, Ill.
[73] Assignee: Amsted Industries Incorporated, Chicago, Ill.
[22] Filed: Mar. 18, 1976
[21] Appl. No.: 668,136
[52] U.S. Cl. .................................. 403/274; 29/6; 29/509
[51] Int. Cl.² ......................................... B25G 3/28
[58] Field of Search .......... 403/274, 292, 297, 277, 403/359; 29/6, 512, 521, 522, 509, DIG. 18; 285/382.4, 222

[56] References Cited
UNITED STATES PATENTS

| | | |
|---|---|---|
| 1,037,289 | 9/1912 | Miller .......................... 403/277 X |
| 1,388,657 | 8/1921 | McDonald et al. ............ 403/277 X |
| 2,279,954 | 4/1942 | Sipe ................................... 403/274 |
| 2,279,955 | 5/1942 | Sipe ................................... 403/277 |
| 2,364,109 | 12/1944 | Taylor .................................. 29/6 |

*Primary Examiner*—Wayne L. Shedd

[57] ABSTRACT

A multiple-piece crankshaft is produced by chamfering one end of each crank arm opening, and providing keyways in and parallel to the chamfered surfaces; each crankshaft and crank pin is provided with a shoulder and is positioned in a crank arm opening with the shoulder opposite the chamfer; the projecting ends of the shaft and pin are cold formed into the respective chamfer and keyways.

3 Claims, 4 Drawing Figures

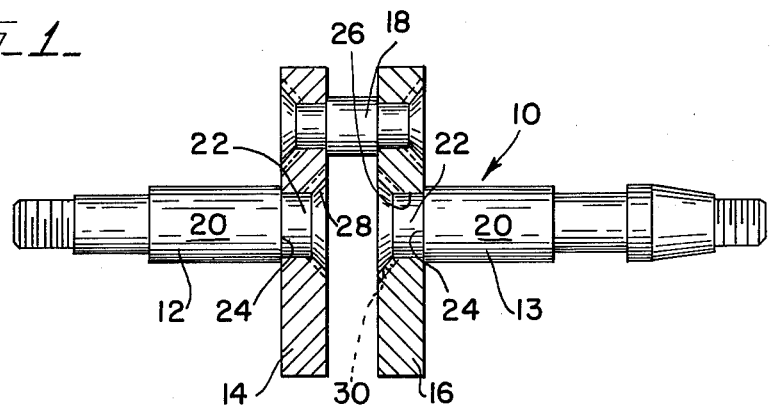
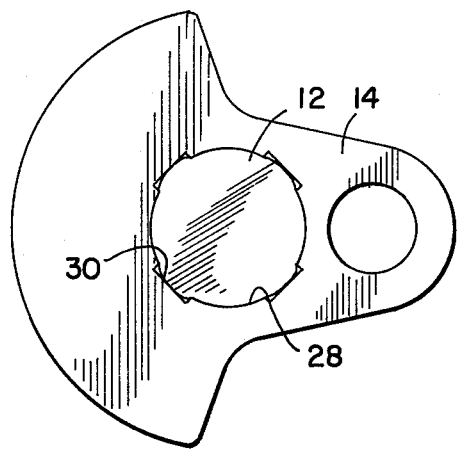
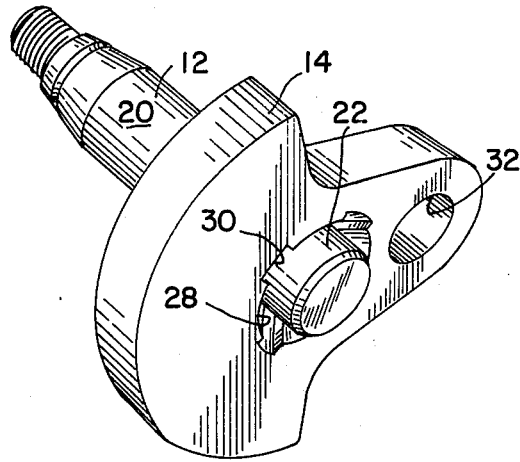
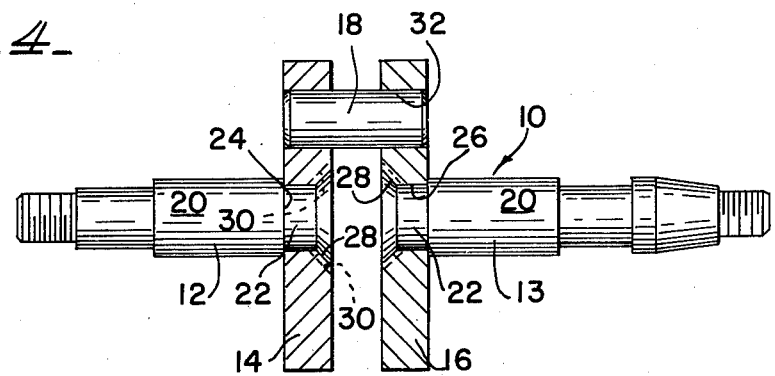

MULTIPLE-PIECE CRANKSHAFT

This invention relates to multiple-piece crankshafts and to a method of making them.

Much work has been done over the years to find a suitable, less expensive substitute for the unitary crankshaft, and numerous methods have been proposed for making multiple-piece crankshafts. The results of these efforts, however, have not been entirely satisfactory, either because of the high production costs involved or because of the lack of strength and dependability of the joints interconnecting the various segments of the multiple-piece crankshaft. In the instances where press or shrink fits are employed, extreme machining accuracy is required in order to attain fairly high resistance to relative rotational movement in the joints. High joint strength, on the other hand, can be achieved by providing the shaft or pin as well as the crank arm bores with grooves or splines but this type of construction is extremely costly.

It is the primary object of the present invention to provide a multiple-piece crankshaft, and a method of making same, which has dimensional accuracy and adequate joint strength, while being much less expensive to fabricate than one-piece crankshafts and prior art multiple-piece crankshafts.

Other objects will be apparent from the following description and accompanying drawings wherein:

FIG. 1 is a longitudinal sectional view of one embodiment of a crankshaft formed by the method of the present invention;

FIG. 2 is an end elevational view of a crank arm with a shaft assembled thereto;

FIG. 3 is a perspective view of a crank arm and a shaft at an intermediate stage of fabrication; and FIG. 4 is a view similar to FIG. 1 showing another embodiment of the invention.

Referring first to FIGS. 1 through 3 of the drawings, a multiple-piece crankshaft 10 is preferably formed of a pair of cylindrical shafts 12 and 13 to which are secured a pair of crank arms 14 and 16. A crank pin 18 interconnects the opposed crank arms 14 and 16.

Each shaft includes a main body portion 20 and a smaller diameter end portion 22 thereby forming a shoulder 24. The crank arm openings 26 which receive the shaft portions 22 are chamfered only at one end as at 28 and each chamfer is provided with a plurality of keyways 30 which are cut parallel to the chamfer surface.

The first step in the assembly procedure is to insert the small diameter portion 22 of a shaft into an opening 26 of a crank arm with the shaft shoulder 24 abutting the arm on the face opposite the chamfer. The portion 22 projects slightly beyond the chamfered face as seen in FIG. 3. The end of the shaft is then cold formed into the chamfer 28 and into the keyways 30, as seen in FIGS. 1 and 2, so as to be locked rigidly and accurately in place. The opposing shaft and the crank pin 18 are secured to the crank arms in the same manner. A suitable method of producing the cold formed joints is by the conventional noiseless riveting or orbital forming process.

Another embodiment of the invention is shown in FIG. 4. In this embodiment, the shafts 12 and 13 are secured to the crank arms 14 and 16 in the same manner as described heretofore with references to FIGS. 1 and 2. The crank pin 18, however, is merely press fit into crank arm openings 32. This construction may be utilized when comparatively lower forces are to be transmitted.

It should be noted that, in the method of making a multiple-piece crankshaft described above, no special tolerances or accurately machined surface finishes are required either for the outer diameter of the shaft or for the openings through the crank arms which receive the shaft. The crankshafts, therefore, are more easily made and are less expensive than crankshafts made by prior art methods, but still retain adequate strength and dimensional stability.

I claim:

1. A multiple-piece crankshaft comprising: a shaft having a body portion and a smaller diameter portion at one end forming a shoulder; at least one crank arm having an opening therethrough, said opening being chamfered at one end; a plurality of keyways in and parallel to said chamfer; the smaller diameter portion of said shaft being received in said opening with said shoulder abutting said crank arm on the face thereof opposite said chamfer and with said smaller diameter portion extending into said chamfer; said smaller diameter portion being conformed to fill said chamfer and to substantially fill said keyways so as to be rigidly locked in assembled relationship with the crank arm.

2. A multiple-piece crankshaft including a crank arm having an opening therethrough, said opening being chamfered at one face of the crank arm, a plurality of keyways in and parallel to the chamfer; a shaft having a body diameter larger than said opening and a smaller diameter portion received in said opening and shouldered against the face of the crank arm opposite the chamfer; the end of the smaller diameter portion being deformed to fill said chamfer and substantially fill said keyways so that the shaft and crank arm are rigidly secured to each other.

3. A method of forming a multiple-piece crankshaft wherein at least one crank arm is rigidly secured to a shaft, comprising the steps of: forming an axially extending opening through the arm, chamfering the opening at one face of the arm, forming a plurality of keyways in and parallel to the chamfered surface; forming a shaft having one end with a smaller diameter portion, said portion having a length at least equal to the thickness of said arm; inserting said portion into said opening from the side of the arm opposite the chamfer; and cold forming said portion so that it substantially fills said chamfer and said keyways so that the shaft and crank arm are locked together in rigid assembly.

* * * * *